United States Patent [19]

Anderson et al.

[11] 3,876,541
[45] Apr. 8, 1975

[54] PACKED BED REACTOR APPARATUS FOR WASTEWATER TREATMENT

[75] Inventors: Merlin H. Anderson; John J. Scholten, both of Ames, Iowa

[73] Assignee: General Filter Company, Ames, Iowa

[22] Filed: Mar. 21, 1974

[21] Appl. No.: 453,558

[52] U.S. Cl. ............... 210/150; 210/220; 261/124
[51] Int. Cl. ...................... B01d 12/00; B01f 3/04
[58] Field of Search ............ 210/17, 150, 220, 221; 261/36 A, 91, 94, 98, 124, 29

[56] References Cited
UNITED STATES PATENTS

| 1,473,160 | 1/1923 | Robbins | 261/124 |
| 2,329,712 | 9/1943 | Gillican | 210/220 X |
| 2,583,725 | 1/1952 | Brown et al. | 210/220 X |
| 3,672,571 | 6/1972 | Goodricke | 261/124 |

Primary Examiner—Theodore A. Granger

[57] ABSTRACT

Packed Bed reactor apparatus for treatment of wastewater by aerobic bacterial action is provided with combined water and air inlet means wherein the air distribution pipes extend within the water distribution pipes with releasable connections interposed between the air header and the ends of the air pipes. Access means is also provided so that the releasable air pipe connections can be reached from outside of the tank, thereby permitting the air pipes to be disconnected and removed from the water pipes for inspection and servicing without disturbing the bacterial treatment bed and permitting cleaning the interior of the water distribution pipes which may foul with organic growths.

12 Claims, 5 Drawing Figures

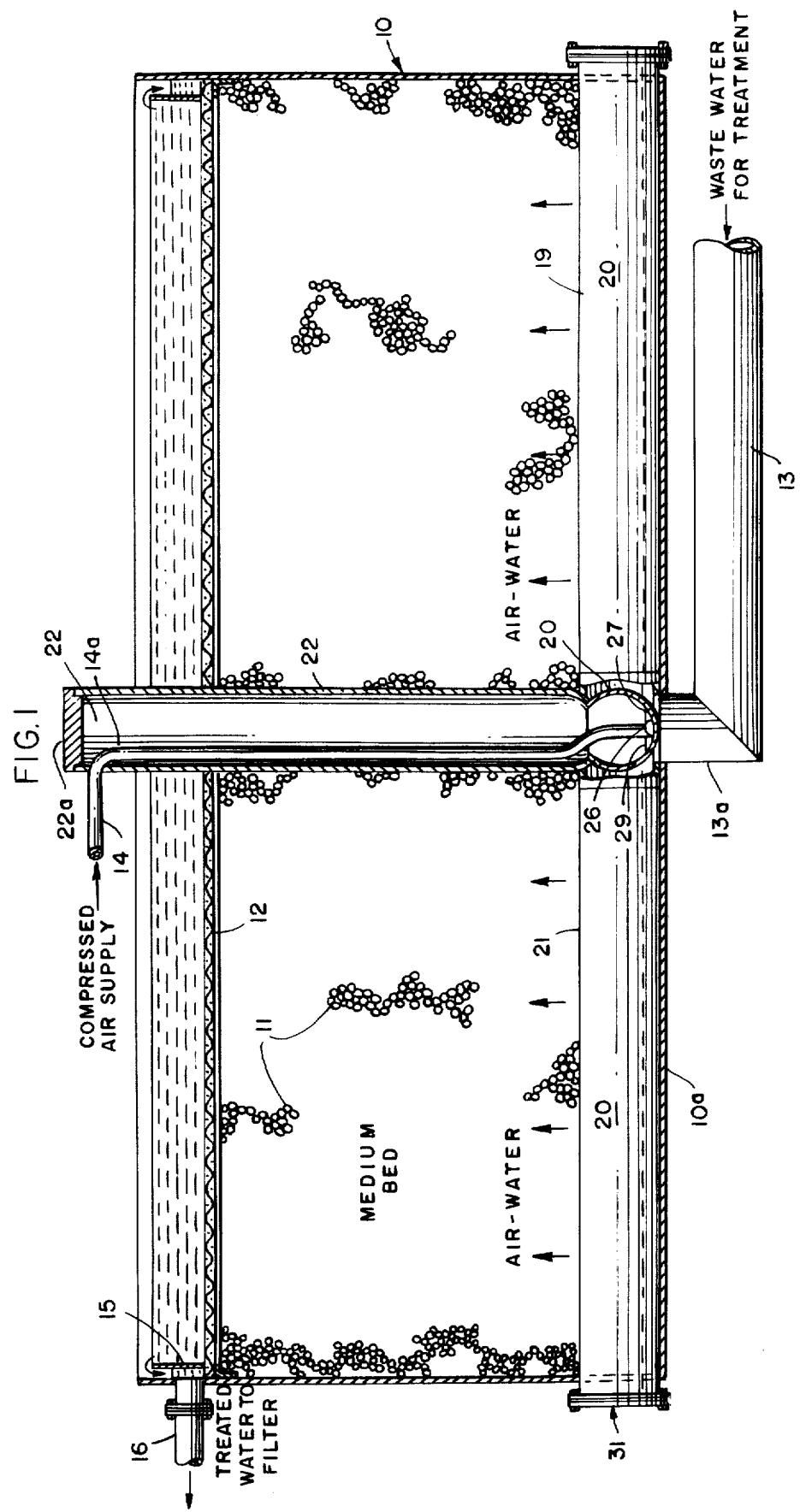

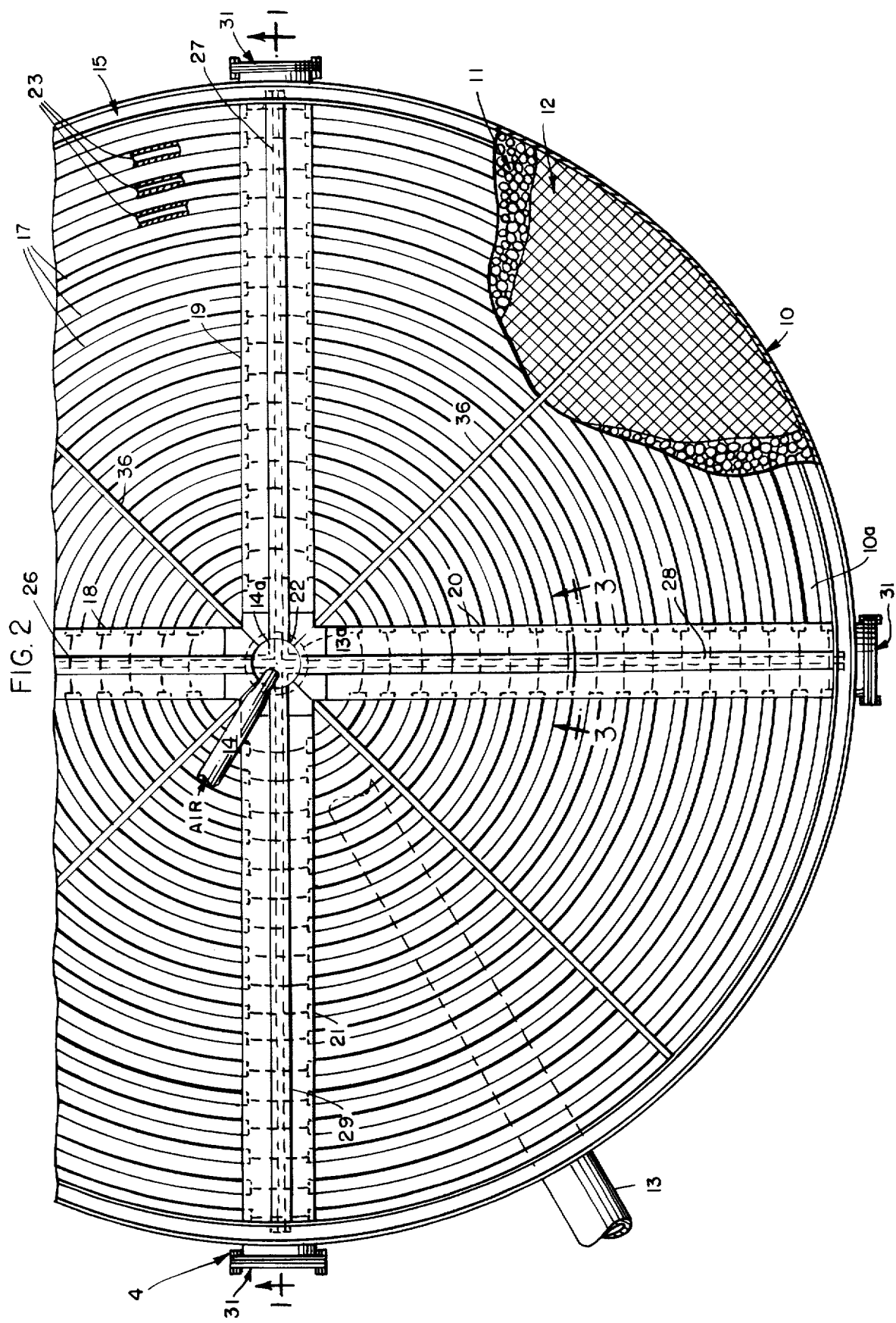

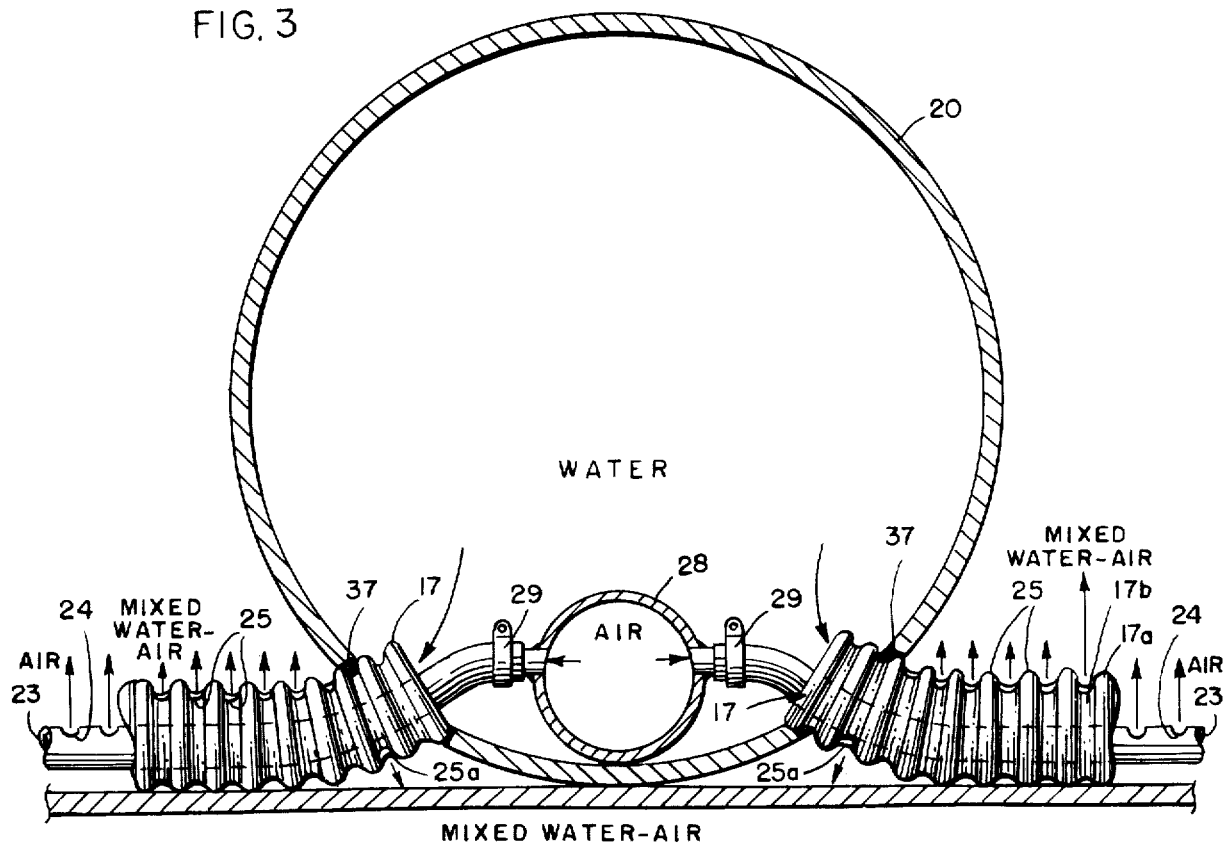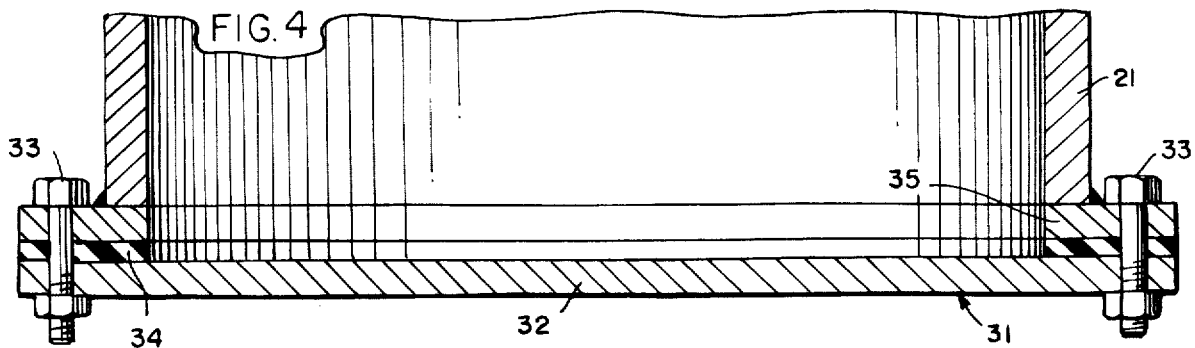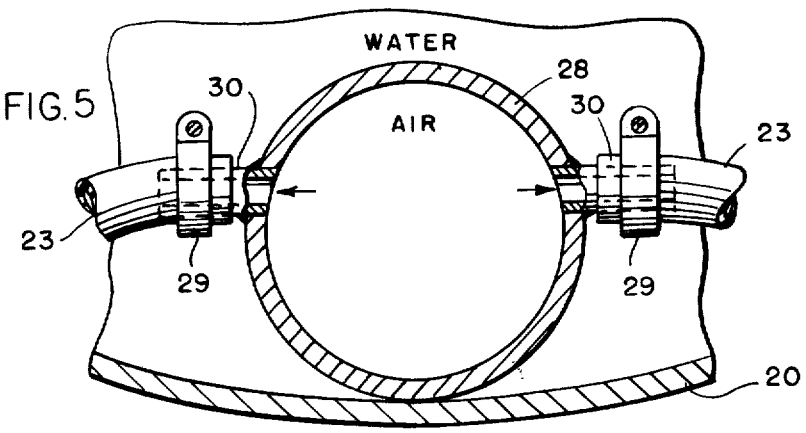

PACKED BED REACTOR APPARATUS FOR WASTEWATER TREATMENT

BACKGROUND AND PROBLEM

It has been demonstrated in laboratory and pilot plant experiments that advanced wastewater treatment for removal of dilute soluble organic materials can be carried out by aerobic bacterial action in an adsorption bed, now referred to as a "Packed Bed" reactor: Johnson and Baumann, "Advanced Organics Removal by Pulsed Adsorption Beds," Jour. Water Poll. Control Fed., 43, 1640–1657 (Aug. 1971). A contact medium, such as sand, finely-divided anthracite coal or modules of other materials such as ceramics or plastics, is maintained as the reactor bed within a tank or column. As the wastewater to be treated, together with air, is passed concurrently upward through the bed, the growth of aerobic bacteria on the medium is promoted. The air supplied oxygen for biological oxygen demand of the bacteria. Moreover, the soluble organic materials are concentrated at the water-medium interfaces due to the adsorption effect of the medium on the dissolved organic material. The result is enhanced biological degradation of the dissolved organic materials, which otherwise would be present in too great a dilution for efficient degradation. The air flow through the reactor bed also provides a pulsing or scouring agitation, which tends to prevent clogging or plugging of the bed.

The same kind of Packed Bed reactor can also be utilized for biological nitrification, that is, for the removal of ammonia nitrogen by conversion to nitrates by aerobic bacterial action: Haug and McCarty, "Nitrification With Submerged Filters," Jour. Water Poll. Control Fed., 44, 2086–2101 (Nov. 1972). This additional application of bacterial-action Packed Beds has made it even more important to design commercial scale apparatus which is practical for long term plant use.

In designing large scale commercial apparatus for carrying out the Packed Bed treatment of wastewater by aerobic bacterial action, a problem with respect to long term continued operation of the apparatus has been encountered. Where an air distribution means, such as air grid, is provided within the lower portion of the Packed Bed, the release of air, although originally designed to be uniform over the entire cross-section of the bed, tends to change and become non-uniform due to plugging of the air outlet orifices by the growth of bacteria. For efficient operation of the bed, and to avoid clogging or plugging thereof, it is important to maintain a uniform high rate of aeration across the bed, thereby obtaining a scouring or pulsing action in addition to supplying oxygen for the growth of the bacteria. Consequently, when plugging of some of the air outlet orifices begins to occur due to bacterial growth, the resultant non-uniform air distribution can lead to the localized clogging of the bed, which will then require a shut-down of the apparatus for correction. If the Packed Bed medium is removed from the reactor to obtain access to the air distribution pipes, considerable time can be required for the servicing. Further, when the apparatus is placed back in operation, a return to efficient removal of the dissolved organic material will be delayed until the aerobic bacteria have reestablished themselves on the medium. This may require as long as 4 to 8 hours for BOD removal and from 4 to 8 days for nitrification. Cross seeding with microorganisms from other operational units will substantially reduce this lag time.

Even where provision is made for servicing and cleaning of the air and water inlet pipes without removing the medium from the bed, the shut-down time can reduce the viable bacterial population of the bed, and lead to a delay in reestablishing the proper level of bacterial growth when the apparatus is placed back in service. It is therefore desired to provide an air inlet system for Packed Bed reactor apparatus which minimizes the need for inspection, servicing, and cleaning, and which, when such maintenance is required, minimizes the shut-down time. The improved apparatus of this invention is believed to provide the best available answer to these objectives.

THE DRAWINGS

The accompanying drawings show an illustrative embodiment of the apparatus of this invention.

FIG. 1 is an elevational view, partly in section, of a Packed Bed reactor apparatus incorporating the improved water and air inlet means of this invention, the section being indicated in FIG. 2.

FIG. 2 is a top plan view, partly broken away, of the reactor apparatus of FIG. 1, the novel water and air inlet means being seen in the bottom of the tank;

FIG. 3 is an enlarged fragmentary sectional view taken on line 3—3 of FIG. 2, showing a portion of the combined water and air inlet means;

FIG. 4 is an enlarged fragmentary view of one of the access ports or manholes, as indicated in FIG. 1; and FIG. 5 is an enlargement of one of the details of FIG. 3.

DESCRIPTION OF THE INVENTION

The overall-configuration of the apparatus is shown in FIG. 1. It will be understood that this is an illustrative embodiment, and that many of the details can be varied while still utilizing the novel features of the present invention.

As shown, the apparatus consists of a large tank 10, which may be formed of steel, concrete, or other suitable material. As shown, tank 10 is open-topped, cylindrical in cross-section, and has a greater diameter than its height. This configuration can be varied to provide beds of different depths and cross-section as required for treating a particular wastewater. The principal function of tank 10 is to provide a space for receiving and containing a horizontally and vertically extending bed 11 of a particulate medium, as indicated in FIG. 1. In the illustration given, the bed 11 substantially fills the space from the bottom 10a of the tank upwardly to the retaining screen 12 and across the diameter of the tank.

The medium may comprise sand or finely-divided anthracite coal. An artificial medium may also be employed, such as molded contact elements of polyethylene or other material. Such elements may be in the form of cup-shaped members. In general, the media should provide as much surface area as possible for contact of the dissolved organic material (or ammonia) from the wastewater and for the growth of bacteria thereon. The specific medium is not critical with respect to the novel features of the present invention.

In the operation of the apparatus of FIG. 1, the wastewater for treatment may be supplied through an inlet header means, such as the large diameter pipe 13.

An air header is also provided for supplying compressed air. As shown in FIG. 1, this may comprise the air supply pipe 14. As will subsequently be described in greater detail, there is provided in the lower portion of tank 10 a combined water and air inlet means. This combined means receives water from inlet pipe 13 and air from inlet pipe 14, and distributes and intermixes the air and water so that aerated water is released into the lower portion of the tank for passage upwardly through the bed 11, as indicated by the flow arrows in FIG. 1.

After bacterial treatment of the water in the bed, the treated water passes through screen 12 and collects in the upper portion of the tank 10 from whence it overflows into a perimeter collector 15, which comprises an open-top annular trough. With some media 11 such as sand or anthracite screen 12 is not required. Treated water is removed from collector 15 through a suitable effluent removal means, such as the pipe 16, which communicates with the annular trough 15.

The features which particularly characterize the present invention will now be described.

An overall view of a combined water and air inlet means, comprising an illustrative embodiment of the present invention, is shown more clearly in FIG. 2. It includes a plurality of substantially uniformly spaced water inlet pipes 17 disposed horizontally in the lower portion of tank 10 substantially beneath media bed 11. In the illustration given, pipes 17 are arranged in concentric circles within the tank, and are disposed within the lowermost portion of bed 11.

Common water header means is connected to water pipe 17 for supplying the wastewater thereto. As shown in FIG. 2, the common water header means comprises a plurality of innerconnected header pipes 18, 19, 20 and 21. These header pipes extend outwardly from the center of the lower portion of the tank, and are arranged to divide the tank lower portion into substantially equal sections. As shown, the header pipes 18, 19, 20 and 21 extend radially from the center of the tank, and they divide the tank into quadrants. It will be apparent, however, that by employing a smaller or larger number of the header pipes, the tank may be divided into semicircular sectors, or other uniform segments of a circle. Depending on the cross-sectional size or diameter of the tank, from 2 to 6 of the header pipes can be advantageously employed.

The upwardly extending leg 13a of water inlet pipe 13 communicates with the inner end of the pipes 18-21 at their central interconnection, as indicated in FIGS. 1 and 2. Extending upwardly from the top of the interconnection of the water header pipes 18-21, there may be provided a riser 22 as shown more clearly in FIG. 1, the air supply pipe 14 may be provided with a downwardly extending leg 14a received within riser 22, and the upper end of riser 22 may be closed with a removable plate as indicated at 22a. The purpose of riser 22 is to serve as an access manhole to the air and water distribution systems when the tank 10 is buried. When the tank 10 is buried and riser 22 is provided, removable covers 31 are replaced with welded non-removable covers.

Also in accordance with the present invention, there are provided air inlet pipes extending inside each of the outer inlet pipes 17. In FIG. 2, these air inlet pipes are designated by the number 23 and can be seen within the broken away portions of the water inlet pipes 17.

The construction can be seen more clearly in FIG. 3. The water header, such as the header 20 has the water distribution pipes 17 extending outwardly from the lower portion thereof. Water header pipe 20 may be formed of steel, while water distribution pipes 17 and air distribution pipes 23 can be advantageously formed of a flexible plastic material. For example, water pipes 17 may be flexible polyethylene pipe formed with spaced reinforcing ribs 17a between flexing sections 17b. As indicated in FIG. 3, corrugated pipes 17 may be sealed to headers 20 by means of caulking 37. The air distribution pipes 23 may be formed of straight non-corrugated flexible polyethylene pipe. The air pipes are advantageously of a relatively small diameter compared to the diameter of the water pipes, thereby permitting the water to flow outwardly from the water headers through the water distribution pipes 17 without undue interference from the location of the air pipes 23 within the water distribution pipes. For example, air pipes may have an external diameter of about 1 inch compared to an internal diameter of about 4 inches for the water pipes. Both the water pipes 17 and the air pipes 23 are provided with a multiplicity of outlet orifices extending along their lengths for substantially uniform introduction of the water and air. In the illustration given, the air outlet orifices in pipes 23 are designated by the number 24. As shown, orifices 24 extend along the top portions of the flexible air hoses, but the location is not critical. In use the air hoses tend to twist but this does not affect the operation. As shown, the flexible water distribution pipes 17 are provided with orifices 25 along their top portions, and with an occasional outlet 25a in their bottom portions. With this arrangement, the air is pre-mixed with the water within the water distribution pipes 17, so that mixed water and air is discharged through the orifices 25 and 25a. Common air header means is provided to supply air to the flexible air pipes 23. Preferably, the common air header pipes are disposed within the water header pieps. As shown in FIGS. 2 and 3, air header pipes 26, 27, 28 and 29 are disposed, respectively, within the water header pipes 18, 19, 20 and 21. These air header pipes extend radially outwardly from the central portion of the tank, and are connected at their inner ends to the lower end of the downwardly extending leg 14a of the air supply pipe 14. As will be apparent from FIG. 3, the air header pipe 28 is of relatively small diameter compared to the water header pipe 20. For example, the water header pipe may have a diameter of about 30 inches and the air header pipe a diameter of about 6 inches.

An important feature of the present invention is the provision of releasable connection means interposed between the air header means and the ends of the air pipes to which the air header means is connected. For example, as shown in FIG. 3, releasable connection means comprising clamps 29 are provided between the air header 28 and the ends of the air distribution pipes 23. As shown more clearly in FIG. 5, pipe nipples 30 are arranged to extend outwardly from the sides of the water header pipes, such as the pipe 28, thereby providing male adaptors for the connection of the hoses 23. As shown, the inner ends of the hoses 23 are slipped over the outer ends of the nipples 30, and are releasably clamped thereon by means of hose clamps 29. It should be understood, of course, that other releasable connection means can be provided, while accomplishing the same purposes.

Another important feature of the present invention is to arrange the releasable connections between the ends of the air distribution pipes 23 and the air headers 28 so that the connections are accessible from outside of the tank 10, thereby permitting the air distribution pipes to be disconnected and removed from the water distribution pipes for inspection and servicing without disturbing the medium bed. For small diameter tanks, it is feasible to reach into the water header pipes for purpose of obtaining access to the releasable connections. For this purpose, the outer ends of the water header pipes, such as the pipes 18, 19, 20 and 21 are extended to the sidewall of the tank 10, and means are provided for permitting access to the outer ends of the header pipes through the tank wall. For example, as shown in FIGS. 1 and 2, the outer ends of the header pipes can be extended through the tank walls and provided with removable access covers designated generally by the number 31. The covers 31, thereby, in effect, provide access manholes. Preferably, however, the water header pipes, such as the pipes 18-21, have an internal diameter large enough to permit bodily entry therein of a service man.

In FIG. 4, there is shown an enlargement of one of the removable access covers 31. An outer plate 32 is secured by means of a plurality of bolts and nuts 33 against an annular sealing gasket 34, which in turn bears against an annular flange 35 that is secured to the outer end of the water header pipes, such as the pipe 21. To permit access by a service man, the water header pipes 18-21 should have an internal diameter of at least 24 inches, and preferably an internal diameter of at least 30 to 40 inches. When the service man can enter the header pipe bodily, it is a simple matter to release the connections 29, thereby facilitating inspection, servicing, cleaning, and replacement of the air distribution pipes 23.

As shown in FIG. 2, it is preferred to have the air distribution pipes 23 sectionalized, that is, divided into lengths or sections, which extend between adjacent water header pipes and the air header pipes therein. For example, within each of the quadrants of the air water distribution system of FIG. 2, the air distribution pipes 23 comprise circular arcs of increasing lengths, lying on circles of increasing diameter. The sectionalized arcuately arranged air hoses 23 have their outer ends, respectively, extending into the adjacent ones of the water distribution pipes 18-21, and are releasably connected to their respective ones of the air distribution pipes 26-29. With this arrangement, by removing two of the access manholes 31, a workman can enter each of two adjacent water distribution headers, and by working together, can easily release the ends of the same air hose. The hose can then be pulled from within the water distribution pipes 17 into one or the other of the water header pipes. By attaching a draw line to the end of the air hose before it is pulled out of the water distribution pipe, the workman at the opposite end, can easily pull the air hose back into place, after it has been inspected and cleaned, as required. Should the installation of a new air hose be required, a hose end can be attached to the draw rope, pulled through the water distribution pipe, attached to the air header on the other side. The workman introducing the new air distribution pipe, then need only cut-off the flexible pipe to the proper length for insertion on the nipple 30. The clamps 29 can then be reapplied at both ends. As will be understood, this process can be repeated sequentially, as required. For example, the workman can move in progressively from the outer ends of the water distribution headers toward the center of the tank. In this way, thorough prompt servicing of the air distribution pipes can be accomplished. Any air orifices that have become plugged with bacteria can be quickly cleaned out, or if the entire tube has become fouled by plugging, it can be readily replaced. By this procedure, the shut-down time of the apparatus can be kept to a minimum. Since there is no disturbance of the bacterial-supporting medium bed, and since the shut-down time is minimized, the apparatus can be returned to full efficiency in a much shorter time after its operation is started-up again.

Certain other details of construction are desirable, although not essential. Laterally extending hold down beams or bars 36 can be provided to extend over the media retaining screen 12. Instead of a screen, a perforated plate or grid can be used. The screen or grid can be formed of aluminum or other non-corrosive material, and should have its openings sized to retain the medium within the tank, and substantially prevent it from being carried out with the effluent. With some media 11 such as sand or anthracite coal, the hold down screen 12 is not required.

If desired, a supporting screen or grid can be provided beneath the media bed immediately above the combined water and air distribution means. However, this is not necessary. In the illustration given, the spaces between the water distribution pipes 17 are also filled with the medium 11. By providing several outlet ports along the lower portion of the distribution pipes 17, aerated water will also be passed over and through the portions of the media between the pipes 17, thereby also utilizing these portions of the media for the treatment of the wastewater.

We claim:

1. Packed bed reactor apparatus for treatment of wastewater by aerobic bacterial action, including tank means containing a horizontally and vertically extending bed of particulate medium capable of supporting aerobic bacterial growth, and outlet means for removing the treated wastewater from the upper portion of said tank, wherein the improvement is characterized by providing the lower portion of said tank with combined water and air inlet means comprising:

a. a plurality of substantially uniformly spaced water inlet pipes horizontally disposed in the lower portion of said tank beneath said bed, said pipes having a multiplicity of outlet orifices for substantially uniform introduction of the water to be treated over the horizontal extend of said bed;

b. common water header means connected to said water pipes for supplying wastewater thereto;

c. air inlet pipes extending inside each of said water inlet pipes along the length thereof, said air pipes being of relatively small exterior diameter compared to the internal diameter of said water pipes and providing a multiplicity of air outlet orifices for substantially uniform release of air along the lengths of said water pipes;

d. common air header means connected to said air pipes for supplying air thereto; and e. releaseable connection means interposed between said air header means and the ends of said air inlet pipes to which said air header means is connected, said connection means being accessible from the outside of said tank means to permit said air pipes to be disconnected and removed from said water pipes for inspection, cleaning, and servicing without disturbing said bed.

2. The apparatus of claim 1 in which said air header means extends within said water header means, and said water header means has an internal diameter sufficiently large to provide a manway for servicing, said water header means having an end extending to a sidewall of said tank means and being accessible through said sidewall from outside said tank means, and a removable cover for said accessible end of said water header means.

3. The apparatus of claim 2 in which said water header means comprises a plurality of interconnected header pipes extending outwardly from the center of the lower portion of said tank means, and being arranged to divide said tank means lower portion into substantially equal sections.

4. The apparatus of claim 3 in which said water inlet pipes comprise separate pipe sections extending between adjacent ones of said header pipes across said tank sections, and said air inlet pipes comprise separate pipe sections extending through said water inlet pipe sections.

5. The apparatus of claim 4 in which said air inlet pipe releasable connection means comprise releasable connections located within said water header pipes at each end of said air pipe sections.

6. The apparatus of claim 3 in which each of said interconnected water header pipes extends from the center of said tank to a sidewall of said tank means, and is accessible through said sidewall from outside said tank means, and a removable cover is provided for each of said accessible ends of said water header pipes.

7. The apparatus of claim 6 in which water inlet means extends into the lower central portion of said tank means and is connected to the inner ends of said water header pipes.

8. Packed bed reactor apparatus for treatment of wastewater by aerobic bacterial action, including a cylindrical tank containing a horizontally and vertically extending bed of particulate medium capable of supporting aerobic bacterial growth, and outlet means for removing the treated wastewater from the upper portion of said tank, wherein the improvement is characterized by providing the lower portion of said tank with combined water and air inlet means comprising:

a. a plurality of substantially uniformly spaced water inlet pipes horizontally disposed in the lower portion of said tank beneath said bed, said pipes having a multiplicity of outlet orifices for substantially uniform introduction of the water to be treated over the horizontal extend of said bed, said water inlet pipes being arranged in concentric circles within said tank;

b. common water header means extending diametrically across said tank and being connected to the said water pipes on each side thereof for supplying wastewater thereto;

c. flexible air inlet pipes disposed inside of each of said water inlet pipes and extending along the length thereof, the ends of said air inlet pipes projecting into said water header means, said air pipes being of relatively small exterior diameter compared to the internal diameter of said water pipes and providing a multiplicity of air outlet orifices for substantially uniform release of air along the lengths of said water pipes;

d. common air header means disposed within said water header means and being connected to the ends of said flexible air pipes extending into said water header means, thereby supplying air to said air pipes; and e. releaseable connection means interposed between said air header means and the ends of said air pipes within said water header means.

9. The apparatus of claim 8 in which said water header means has an internal diameter sufficiently large to provide a manway for servicing, said water header means having at least one end extending to a sidewall of said tank and being accessible through said sidewall from outside said tank, and a removable cover for said accessible end of said water header means.

10. The apparatus of claim 9 in which said water header means comprises a plurality of interconnected header pipes extending radially outward from the center of the lower portion of said tank, and being arranged to divide said tank lower portion into substantially equal sections.

11. The apparatus of claim 10 in which water inlet means extends into the lower central portion of said tank means and is connected to the inner ends of said water header pipes.

12. The apparatus of claim 11 in which the outer ends of each of said water header pipes extends to an outer wall of said tank and is accessible therethrough, and removable cover means provided for each of said accessible ends of said water header pipes.

* * * * *